(12) United States Patent
Bunker

(10) Patent No.: US 9,803,939 B2
(45) Date of Patent: Oct. 31, 2017

(54) METHODS FOR THE FORMATION AND SHAPING OF COOLING CHANNELS, AND RELATED ARTICLES OF MANUFACTURE

(71) Applicant: General Electric Company, Schenectady, NY (US)

(72) Inventor: Ronald Scott Bunker, West Chester, OH (US)

(73) Assignee: General Electric Company, Niskayuna, NY (US)

(*) Notice: Subject to any disclaimer, the term of this patent is extended or adjusted under 35 U.S.C. 154(b) by 852 days.

(21) Appl. No.: 14/088,128

(22) Filed: Nov. 22, 2013

(65) Prior Publication Data

US 2015/0147165 A1 May 28, 2015

(51) Int. Cl.
| | |
|---|---|
| *F01D 5/18* | (2006.01) |
| *F28F 19/06* | (2006.01) |
| *F28F 19/02* | (2006.01) |
| *C23C 24/04* | (2006.01) |
| *F28F 13/18* | (2006.01) |
| *C23C 4/01* | (2016.01) |
| *C23C 4/073* | (2016.01) |

(52) U.S. Cl.
CPC ............... *F28F 19/06* (2013.01); *C23C 4/01* (2016.01); *C23C 4/073* (2016.01); *C23C 24/04* (2013.01); *F01D 5/187* (2013.01); *F28F 13/185* (2013.01); *F28F 19/02* (2013.01); *F05D 2230/31* (2013.01); *F05D 2230/90* (2013.01); *F05D 2260/204* (2013.01); *Y02T 50/672* (2013.01); *Y02T 50/676* (2013.01)

(58) Field of Classification Search
CPC ............... F01D 5/187; F05D 2260/204; F05D 2230/31; F05D 2230/90; F28F 19/06; F28F 13/185; F28F 19/02; C23C 4/01; C23C 4/073; C23C 24/04; Y02T 50/672; Y02T 50/676

See application file for complete search history.

(56) References Cited

U.S. PATENT DOCUMENTS

| | | | |
|---|---|---|---|
| 6,234,755 B1 | 5/2001 | Bunker et al. | |
| 7,157,151 B2 * | 1/2007 | Creech | C23C 4/18 428/621 |
| 7,722,325 B2 * | 5/2010 | Cunha | F01D 5/186 415/115 |
| 8,387,245 B2 | 3/2013 | Bunker et al. | |
| 2006/0222492 A1 * | 10/2006 | Gross | F01D 5/288 416/97 R |
| 2012/0114912 A1 | 5/2012 | Bunker et al. | |
| 2013/0153089 A1 | 6/2013 | Ajdelsztajn et al. | |
| 2013/0177437 A1 | 7/2013 | Amancherla et al. | |
| 2015/0147479 A1 | 5/2015 | Bunker et al. | |

OTHER PUBLICATIONS

Julio Villafuerte, Current Trends in Cold Spray Technology: Looking at the Future, Jan. 8, 2010, Centerline Windsor, Ltd.

* cited by examiner

*Primary Examiner* — Richard Edgar
(74) *Attorney, Agent, or Firm* — John P. Darling

(57) ABSTRACT

A method to modify the shape of a channel in a metallic substrate is described. The method includes the step of applying at least one metallic coating on selected portions of an interior surface of the channel, so as to alter the heat transfer characteristics of the channel during passage of a coolant fluid therethrough. Related articles that contain the modified channels are also described, such as gas turbine engine components.

20 Claims, 3 Drawing Sheets

METHODS FOR THE FORMATION AND SHAPING OF COOLING CHANNELS, AND RELATED ARTICLES OF MANUFACTURE

BACKGROUND

The general subject matter of this invention relates to cooling channels for articles used at high temperatures, such as gas turbine engines. Some specific embodiments relate to methods for making and shaping the cooling channels.

A gas turbine engine includes a compressor, in which engine air is pressurized. The engine also includes a combustor, in which the pressurized air is mixed with fuel, to generate hot combustion gases. In a typical design (e.g., for aircraft engines or stationary power systems), energy is extracted from the gases in a high pressure turbine (HPT) which powers the compressor, and in a low pressure turbine (LPT). The low pressure turbine powers a fan in a turbofan aircraft engine application, or powers an external shaft for marine and industrial applications.

The need for cooling systems in gas turbine engines is critical, since the engines usually operate in extremely hot environments. For example, the engine components are often exposed to hot gases having temperatures up to about 3800° F. (2093° C.), for aircraft applications, and up to about 2700° F. (1482° C.), for the stationary power generation applications. To cool the components exposed to the hot gases, these "hot gas path" components typically have both internal convection and external film cooling.

Many aspects of cooling circuits and features in various hot gas path components have been described in the art. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability, while minimizing the need for cooling thereof. Various cooling circuits and features are tailored for these individual components in their corresponding environments in the engine. For example, a series of internal cooling passages, or serpentine channels, may be formed in a hot gas path component. A cooling fluid may be provided to the serpentines from a plenum, and the cooling fluid may flow through the passages, cooling the hot gas path component substrate and coatings. While this type of cooling design may be effective in some cases, its use in other situations may result in comparatively low heat transfer rates and non-uniform component temperature profiles.

Microchannel cooling (as the feature is explained below) has the potential to significantly reduce cooling requirements by placing the cooling as close as possible to the heat zone, thus reducing the temperature difference between the hot side and cold side for a given heat transfer rate. However, current techniques for forming microchannels typically require the use of a sacrificial filler to keep the coating from being deposited within the microchannels (which usually need to be formed by machining). The sacrificial filler also supports the coating during deposition.

The particular path of a fluid through a cooling circuit is critical for ensuring that the coolant effectively draws heat away from regions subjected to the highest temperatures encountered during operation of a particular turbine engine or other device. As an example, a microchannel can be considered to be a three-dimensional region having various configurations, and including both channel sidewalls, along with some type of bottom surface. Each of the surfaces of the microchannel may be exposed to a different temperature profile during engine operation, depending in part on the curvature, roughness, and overall design of the cooling circuit. Providing more coolant than necessary to a region with a lower temperature profile would be inefficient, and may deprive other high-temperature surfaces with inadequate coolant. This is especially the case when the amount of coolant air available is limited. For example, in the case of a turbine engine, coolant air often needs to be bled off the engine compressor, and engine efficiency may suffer if too much coolant air is diverted to the cooling circuit.

Different techniques can be undertaken to influence the coolant flow characteristics within a cooling channel. As an example, a selected design of the cooling channel could be obtained during the casting of the particular component in which the channel is located. Moreover, machining techniques could be used to alter the depth and shape of a cooling channel that has already been formed. Examples of those processes are laser drilling, water jet cutting, and electro-discharge machining (EDM).

The machining techniques can be effective for beneficially altering the shape of a cooling channel. However, there are drawbacks associated with such methods. For example, they can be time-consuming, thereby increasing the cost of component fabrication. Furthermore, special care sometimes needs to be taken, to ensure that machining processes do not adversely affect the integrity of the component.

Thus, additional processes for modifying the shape of a coolant channel would be welcome in the art. The new processes should be capable of modifying the channel in a way that improves its heat transfer characteristics. They should also be capable of efficient implementation, and compatibility with other processes related to fabrication of the particular component. Moreover, shaping processes that also improved other characteristics of the coolant channel, such as the oxidation resistance of the channel surfaces, would be of considerable interest.

BRIEF DESCRIPTION OF SOME INVENTIVE EMBODIMENTS

A method to modify the shape of a channel in a metallic substrate is described. The method comprises the step of applying at least one metallic coating on selected portions of an interior surface of the channel, so as to alter the heat transfer characteristics of the channel during passage of a coolant fluid therethrough.

Another embodiment of the invention is directed to an article in the form of a high-temperature substrate. The article comprises at least one micro-channel that is situated within an interior region of the substrate, as part of a cooling circuit, wherein the micro-channel terminates at an exit site on a surface of the substrate. The microchannel includes an interior surface, and a metallic coating material is applied on at least a portion of the surface. The coating material is patterned in a manner that both enhances the heat transfer characteristics through portions of the microchannel; and provides oxidation resistance to the interior surface of the micro channel.

DETAILED DESCRIPTION OF THE INVENTION

When introducing elements of various embodiments of the present invention, the articles "a," "an," "the," and "said" are intended to mean that there are one or more of the elements, unless otherwise indicated. Moreover, the terms "comprising," "including," and "having" are intended to be inclusive, and mean that there may be additional elements other than the listed elements. As used herein, the term "and/or" includes any and all combinations of one or more of the associated listed items. Furthermore, unless otherwise indicated herein, the terms "disposed on", "deposited on" or "disposed between" refer to both direct contact between layers, objects, and the like, or indirect contact, e.g., having intervening layers therebetween.

Approximating language, as used herein throughout the specification and claims, may be applied to modify any quantitative representation that could permissibly vary without resulting in a change in the basic function to which it may be related. Accordingly, a value modified by a term such as "about" is not limited to the precise value specified. In some instances, the approximating language may correspond to the precision of an instrument for measuring the value.

Any substrate which is exposed to high temperatures and requires cooling can be used for this invention. Examples include ceramics or metal-based materials. Non-limiting examples of the metals or metal alloys which might form the substrate include steel, aluminum, titanium; refractory metals such as molybdenum; and superalloys, such as those based on nickel, cobalt, or iron. The substrate can also be formed of a composite material, such as a niobium silicide intermetallic composite. Very often, the substrate is at least one wall or other surface of a gas turbine engine component, e.g., a gas turbine blade.

Figure 1:
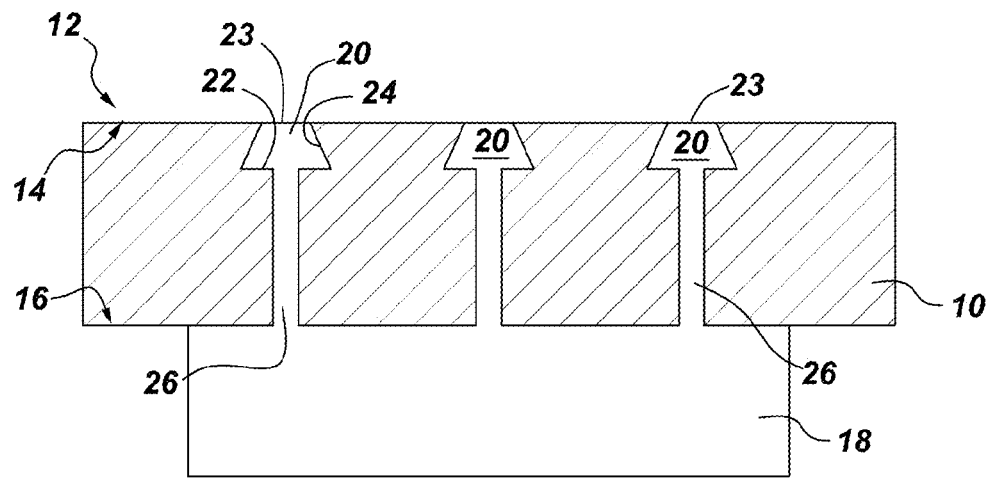
FIG. 1 is a schematic cross-section of a portion of a cooling circuit with re-entrant cooling channels.

FIG. 1 is a schematic cross-section of a portion of a cooling circuit within a substrate 10. The substrate can represent a portion of any high-temperature component 12, as described previously, e.g., a turbine rotor blade. The substrate can include an outer surface 14, and an inner surface 16. (The outer surface can be covered with one or more top layers, as further described below). Inner surface 16 lies above a hollow interior space 18, which itself communicates with an internal region of the particular component.

Each channel or groove 20 can be considered to be an exit site for the particular cooling pathway. Moreover, in this embodiment, each channel includes a base 22 and sidewalls 24. However, the shape of the channel depicted in FIG. 1 is only exemplary; many other shapes and channel sizes are possible.

Moreover, while the term "channels" will be used in this disclosure for simplicity, the preferred types of small channels for many types of end uses are more commonly known as "microchannels". For industrial-sized power generating turbine components, "small" or "micro" channel dimensions would encompass approximate depths and widths in the range of about 0.25 mm to about 1.5 mm. For aviation-sized turbine components, channel dimensions would encompass approximate depths and widths in the range of about 0.1 mm to about 0.5 mm.

With continued reference to FIG. 1, each channel 20 communicates with an access hole 26. The access holes convey coolant that flows from and through interior space 18, e.g., a plenum that carries bypass air from a compressor. Further information and depictions of microchannels are provided in U.S. Patent Publication 2012/0114912 (R. Bunker et al), incorporated herein by reference. U.S. Pat. No. 8,387,245 (Bunker et al) is also instructive, and is incorporated herein by reference. The patent describes various aspects of channel cooling circuits, in which coolant access holes originating from interior regions of a part communicate with coolant channels that can terminate at exit sites, e.g., "exit film holes". It should be understood that the present invention is applicable to many different designs of cooling channels and cooling circuits. Moreover, in many embodiments, the channel-shaping discussed herein can be undertaken throughout the length of the channel, or any segment thereof, including the exit site.

In this illustration, channels 20 are in the form of re-entrant shaped openings. Those skilled in the art understand that this type of shape calls for the base 22 of the channel to be much wider than its upper opening 23. In some cases, the width of the base is about 3-4 times the width of the upper opening. There are various advantages to this type of shape. For example, it reduces the likelihood that excessive amounts of coating material subsequently applied over the outer surface 14 will be deposited in the channels 20, undesirably blocking the cooling passageways.

Figure 2:
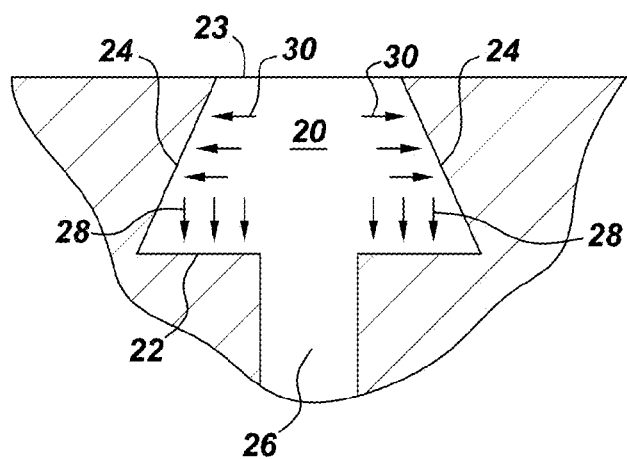
FIG. 2 is an enlarged view of one of the re-entrant cooling channels of FIG. 1.

FIG. 2 schematically depicts, in cross-section, one of the re-entrant shaped channels 20 of FIG. 1 (enlarged), including base/bottom surface 22, upper opening 23, and sidewalls 24. (Bottom surface 22 and sidewalls 24 can collectively be referred to as the "interior surface" of the channel). In the case of a gas turbine engine operating at very high temperatures, some of the designed cooling configurations cause the sidewalls 24 to experience significantly higher thermal exposure, as compared to the bottom surface 22. In order to counter this "thermal imbalance", the sidewalls would benefit from greater exposure to a coolant fluid, as compared to the bottom surface.

Embodiments of the present invention are based on the discovery that the heat transfer characteristics of channel 20 could be balanced by the use of coatings applied to selected portions of the interior surface 28 of the channel. As an example, the controlled deposition (simply depicted by arrows 28 in FIG. 2) of a coating material to at least a portion of the bottom surface 22 of the channel appears to decrease the amount of coolant fluid moving over surface 22. This in turn results in a proportionately greater amount, and higher velocity, of coolant fluid (arrows 30) moving along all or a portion of the interior sidewalls 24 of the channel. In some cooling circuit configurations, the increased flow along the sidewalls can result in a greater rate of heat transfer from those surfaces, which can be very desirable. (As those skilled in the art understand, different cooling circuit designs modified according to this invention can result in different pressure ratios across the cooling channels, which in turn can influence coolant flow characteristics).

The coating material can be applied to the interior surface of the channel by a number of techniques. For example, a thermal spray process can be used. Examples include combustion spray processes and plasma spray processes. In the case of combustion spray techniques, a stream of hot gas and coating powder is directed to the substrate surface. The coating powder partially melts in the stream, and deposits on the substrate. The resulting coating usually has relatively low porosity, and high bond strength. The shape of the deposits that result from these types of techniques will depend in part on the interaction of the spray material with the existing dimensions of the channel being modified. As further explained below, laboratory model testing that is carried out beforehand can generally predict the resulting heat transfer characteristics for the modified channel, thereby serving as a guide or standard for additional coating depositions. The combustion spray techniques are also very adaptable for coating high-temperature components like turbine blades. Specific examples of the combustion spray techniques include high velocity oxygen fuel spraying (HVOF) and high velocity air fuel spraying (HVAF).

In some preferred embodiments, a cold spray technique can be used to apply the coating material to the interior surface of the channel. Cold spray techniques are known in the art, and described in various references, such as "Current Trends in Cold Spray Technology: Looking at the Future"; Julio Villafuerte, Centerline Windsor, Ltd., January 8,), incorporated herein by reference. Other references include U.S. Patent Publications 2013/02010 (www.metalfinishing.com177437 (Amancherla et al), published Jul. 11, 2013; and 2013/0153089 (Ajdelsztajn et al), published Jun. 20, 2013, and co-pending patent application Ser. No. 14/087,897, Ronald S. Bunker et al), all of which are incorporated herein by reference. In very general terms, "cold spray" is a solid-state coating process, i.e., the particles do not melt during the process. Cold spraying uses a high-speed gas jet to accelerate the metallic powder particles toward a substrate, whereby the particles plastically deform and consolidate upon impact. An advantage of using a cold spray technique in some particular embodiments of this invention is the ability to precisely deposit a coating material of desired dimensions, on specified regions of the channel.

As described in Ajdelsztajn et al (noted above), typical cold spray techniques employ a spray gun that receives a high pressure gas, such as helium, nitrogen, or air, along with a feedstock of deposit material, e.g., metals, alloys, or composite materials, in powder form. The powder granules are introduced at a high pressure into a gas stream in the spray gun, and emitted from an appropriate nozzle. The particles are accelerated to a high velocity in the gas stream. They may in fact reach a supersonic velocity. The gas stream may be heated. Typically, the gases are heated to less than the melting point of the particles, so as to minimize in-flight oxidation and phase changes in the deposited material. In some embodiments, the carrier gas is maintained at a temperature in the range of about 20° C. to about 1200° C. Frequently, the velocity of the feedstock during cold-spraying is in the range from about 500 m/s to about 1100 m/s.

As alluded to above, some of the spray systems discussed herein, like cold spray systems, can be computer-controlled during the deposition process. For example, those skilled in the art understand that a spray system can include or be attached to a multi-axis computer numerically controlled (CNC) unit, or similar devices that operate on that principle. The CNC systems themselves are known in the art, and allow movement of the spray gun along a number of X, Y, and Z axes, as well as rotational axes. In this manner, the desired height, width, and length of each coating feature within a channel can be precisely obtained. Since non-uniform patterns of coating material may sometimes be required for most beneficially altering the heat transfer characteristics of a channel, this precision in coating deposition can be to great advantage.

Figure 3:
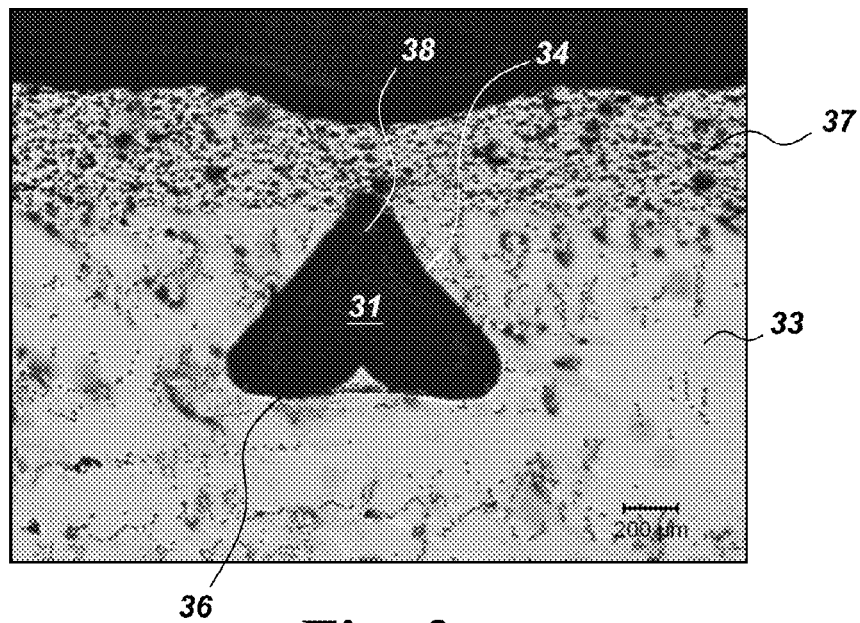
FIG. 3 is a micrograph of a cross-section of a re-entrant shaped channel formed on a superalloy substrate.

FIG. 3 is a micrograph of a cross-section of a conventional, re-entrant shaped channel 31, formed on a nickel-based superalloy substrate 33. The channel had initially been formed on the substrate by a machining technique, although various casting or other forming procedures could have been used. Channel 31 includes sidewalls 34, and a bottom surface 36. In this figure, one protective coating 37 has been applied over the upper surface of substrate 33. As described below, the protective coating is often a metallic coating, and more than one coating may be applied, depending on the requirements for the particular component.

The re-entrant shape depicted in FIG. 3 provides a number of advantages for the exit region of microchannels. One advantage is that the relatively narrow upper opening 38 of the channel prevents or minimizes the deposition of coating material into the channel, where it would otherwise block the flow of coolant (unless removed). In this particular figure of the prior art, only a very small mound 39 of coating material was deposited within channel 31, and this is typically viewed as a distinct processing advantage.

Figure 4:
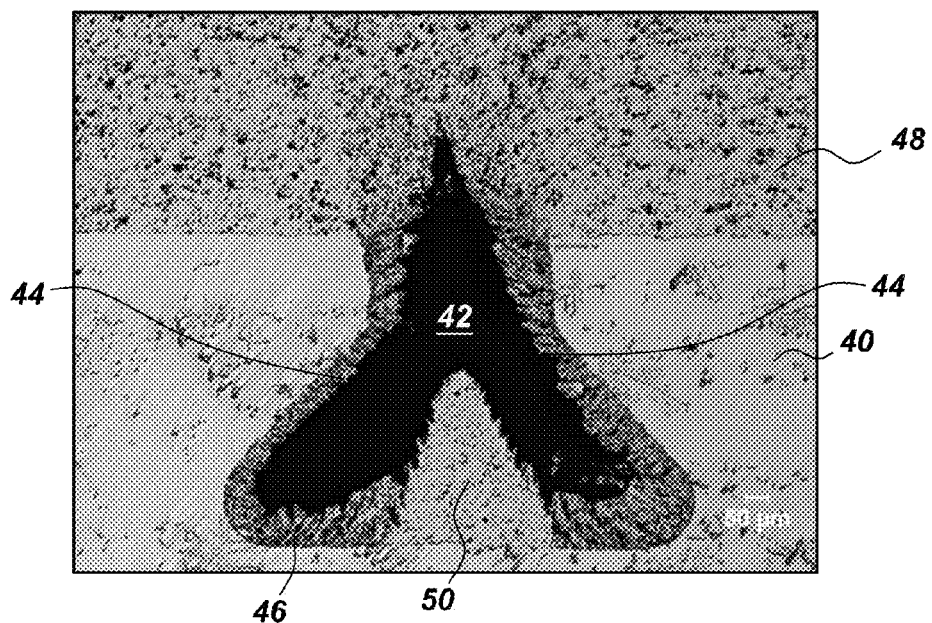
FIG. 4 is another micrograph of a cross-section of a re-entrant shaped channel formed on a superalloy substrate.

FIG. 4 is a micrograph of a cross-section of a re-entrant shaped channel 42, according to embodiments of the present invention. The channel is formed on a superalloy substrate 40, and as in FIG. 3, had initially been formed by a machining technique. Channel 42 includes sidewalls 44, and a bottom surface 46. The channel has been effectively "closed" by the deposition of coating 48 on the surface of substrate 40.

In the embodiment of FIG. 4, a coating material has been deliberately applied on the bottom surface 46 of the channel, forming elevation or "mound" 50 The coating material for this feature was an MCrAlY-type coating (like those described below), applied by a conventional HVOF process.

This feature 50 in FIG. 4 functions, in part, to divert cooling air away from the bottom surface 46—a region in which the presence of the coolant may not be critical. Instead, the coolant is effectively transferred to the sidewalls 44 of the channel—regions where the presence of coolant can often be more critical. Thus, heat can be transferred more effectively away from the sidewalls. In the case of a turbine engine, as described previously, overall engine efficiency can thereby improve, since less coolant air may need to be bled off from the engine compressor.

Moreover, it should be noted that feature 50 could be more precisely constructed than in the example-micrograph set forth in FIG. 4, using the CNC systems, or similar tools, and using a cold spray technique, for example, as described previously. In general, the shape of feature 50 can vary to a considerable extent, and will of course depend in large part on the location and end use for the coolant channel. In many cases, the most appropriate shape can be determined, based on modeling or other testing procedures undertaken prior to modification of a cooling channel. As a very general example, laboratory model testing for coolant flow through a number of sample channels with selected exit shapes could be undertaken. The testing could measure coolant flow, heat transfer, and other characteristics, to determine which channel shape is most effective for a desired level of thermal performance, e.g., heat transfer efficiency. Based on the test data, the techniques described above can be used to appropriately modify the shape of the channel. Moreover, while feature 50 has been deposited in a central region of the channel, there may be situations where a deposit in some other location is preferred, e.g., closer to one or the other of the sidewalls.

In some embodiments which can be very useful for certain applications, the coating applied to the interior of the channel could be an oxidation-resistant coating. Conventional oxidation resistant coatings could be employed, but specialized coatings used for high temperature applications are often of special interest. Examples of such coatings include metal-aluminide compositions (e.g., nickel aluminide or platinum aluminide); and an MCrAlX composition. In the case of MCrAlX coatings, "M" can be iron, nickel, cobalt, or combinations thereof and X can be yttrium, Y, Ta, Si, Hf, Ti, Zr, B, C, or combinations thereof. Non-limiting examples of some of these materials can be found in a variety of references, such as U.S. Pat. No. 6,234,755, incorporated herein by reference.

It may sometimes be desirable for at least one relatively thin and uniform oxidation-resistant coating to initially be applied to most or all of the interior surface of the channels. The specific coating thickness (total) would depend on a number of factors, but in the case of turbine engine components, might typically be in the range of about 10 microns to about 50 microns. Following the deposition of this coating, additional coating material could then be applied over the first layer(s), but only on specific, selected regions of the interior surface, so as to influence heat transfer patterns, as discussed previously.

Alternatively, the depositions could be reversed, i.e., a "shaping" deposition on selected portions of the interior surface, initially, and then followed by a thin, uniform oxidation-resistant coating over the entire surface. In either case, the deposition process for the uppermost layer can also be used, in some instances, to advantageously affect the texture of the coating surface, e.g., its roughness characteristics, to further enhance heat transfer characteristics.

The use of a uniform, oxidation-resistant coating on the interior of a channel has been undertaken previously in the art. Typically, various vapor-phase techniques have been effective in providing such a coating. However, those types of processes would not be effective in providing the precise, shaped coating features that can be obtained by way of embodiments of the present invention, which can often be characterized as "non-uniform".

As mentioned above, at least one top layer is applied over the upper region of the channels, so as to close them off ("bridging") and complete their formation. Layer 48 in FIG. 4 is exemplary. The top layer can be formed of a suitable metallic material like MCrAlX (described above), or it can be formed from a different composition. Thermal spray techniques could be used to apply the top layer, although other techniques are also possible, e.g., plasma-based processes. The thickness of the top layer can vary, and will depend in part on factors like the overall integrity required for the channel-coating system. Moreover, one or more top layers can sometimes advantageously be deposited at an angle, relative to the substrate surface, as described in U.S. Patent Publication 2012/0114912, referenced previously.

In other embodiments, the top layer could be in the form of several layers. For example, a metallic layer could first be applied to close off the channels, followed by a ceramic layer. The ceramic layer could be a yttria-stabilized zirconia material, functioning as a thermal barrier coating (TBC) for the substrate. Those skilled in the art are familiar with coating processes for applying TBC's.

In some cases, a microchannel may already be formed, having an interior surface already shaped for a particular type and amount of coolant flow. The microchannel may have been formed by conventional machining techniques, as described previously, or by way of the casting process used to form the part. In this instance, the process embodiments described herein could be used to alter the shape, e.g., if a different type of coolant flow was now being directed through the hot gas path component. In this manner, modified heat transfer characteristics appropriate for the new situation can be obtained.

Figure 5:
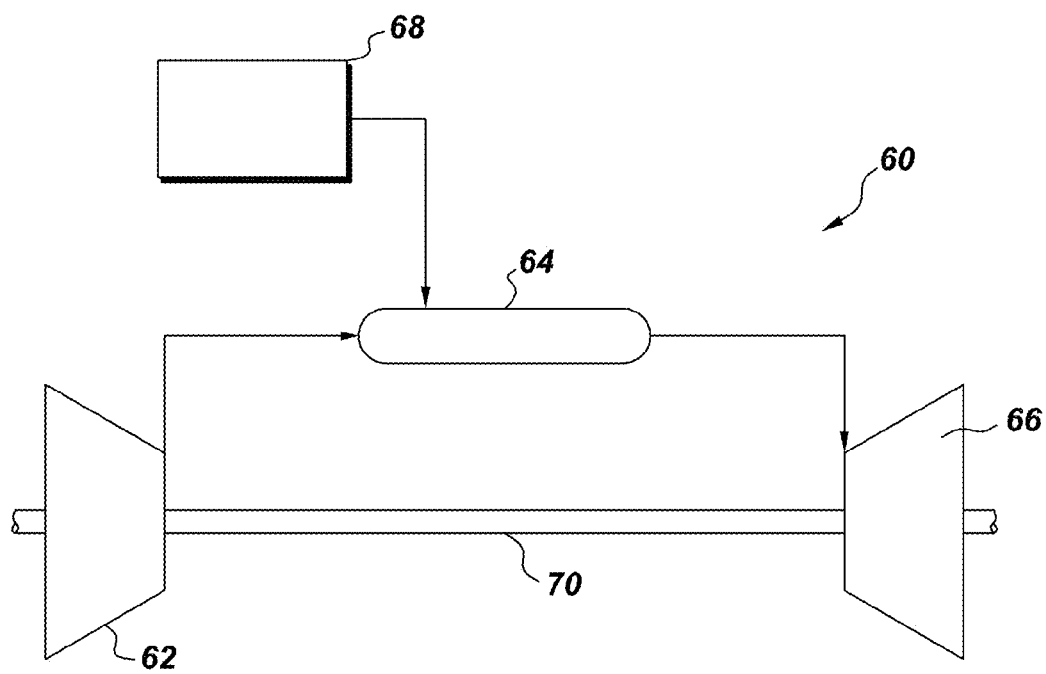
FIG. 5 is a schematic illustration of a turbine engine system.

As mentioned above, embodiments of this invention relate to channel features incorporated into portions of a high-temperature substrate. The substrate can take a number of forms, and is sometimes a turbine engine, e.g., a gas turbine. FIG. 5 is a schematic diagram of typical gas turbine system 60. The system 60 may include one or more compressors 62, combustors 64, turbines 66, and fuel nozzles 68. The compressor 62 and turbine 66 may be coupled by one or more shafts 70. The shaft may be a single shaft or multiple shaft segments coupled together.

As alluded to previously, gas turbine system 60 may include a number of hot gas path components. Bucket assemblies (also known as blades or blade assemblies), nozzle assemblies (also known as vanes or vane assemblies), shroud assemblies, transition pieces, retaining rings, and compressor exhaust components are all typically hot gas path components. The hot gas path component can in fact be any component that is at least partially exposed to a high temperature flow of gas. The patterned/modified microchannels of this invention can be incorporated efficiently into many of these hot gas path components, providing the attendant advantages explained herein.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A method to modify the shape of a re-entrant shaped channel in a metallic substrate, the channel having a base, an opening in the substrate opposite the base, and sidewalls extending from the base to the opening, the method comprising:
    applying at least one metallic coating on the base of the channel, so as to alter the heat transfer characteristics of the channel during passage of a coolant fluid therethrough; and
    applying at least one layer of an oxidation resistant coating uniformly over the at least one metallic coating and the base and the sidewalls of the channel to provide oxidation-resistance to the channel.

2. The method of claim 1, wherein the at least one metallic coating is applied by a thermal spray process or by a cold spray technique.

3. The method of claim 2, wherein the thermal spray process is a combustion spray process or a plasma spray process.

4. The method of claim 3, wherein the combustion spray process is selected from the group consisting of high velocity oxygen fuel spraying (HVOF) and high velocity air fuel spraying (HVAF).

5. The method of claim 1, wherein the at least one layer of the oxidation resistant coating comprises a metal aluminide composition or an MCrAlX composition, where M can be iron, nickel, cobalt, or combinations thereof; and X can be yttrium, tantalum, silicon, hafnium, titanium, zirconium, boron, carbon, or combinations thereof.

6. The method of claim 1, wherein the channel is a microchannel comprising a portion of a cooling circuit; and the metallic substrate is a high-temperature component that contains the cooling circuit.

7. The method of claim 6, wherein the microchannel terminates at the opening in the substrate.

8. The method claims 7, wherein the at least one metallic coating is applied to base of the channel in a non-uniform pattern that increases heat transfer characteristics for the microchannel, during the passage of coolant fluid.

9. The method of claim 1, wherein the sidewalls are generally perpendicular or angled, relative to the base.

10. The method of claim 9, wherein the at least one metallic coating is applied to the base according to a pattern that increases the amount of coolant fluid that contacts the sidewalls, while decreasing the amount of coolant fluid that contacts the base, so as to enhance the transfer of heat away from the sidewalls.

11. The method of claim 1, wherein the substrate is a portion of a turbine engine component.

12. The method of claim 1, wherein a width of the base is 3-4 times the width of the opening.

13. The method of claim 1, wherein the at least one metallic coating comprises a metal aluminide composition or an MCrAlX composition, where M can be iron, nickel, cobalt, or combinations thereof; and X can be yttrium, tantalum, silicon, hafnium, titanium, zirconium, boron, carbon, or combinations thereof.

14. An article in the form of a high-temperature substrate, comprising:
   at least one microchannel that is situated within an interior of the substrate, as part of a cooling circuit, wherein the microchannel includes a base, an opening in the substrate opposite the base, and sidewalls extending from the base to the opening;
   a metallic coating on the base of the channel that alters the heat transfer characteristics of the at least one microchannel during passage of a coolant fluid therethrough; and
   at least one layer of an oxidation resistant coating applied uniformly over the metallic coating and the base and the sidewalls of the channel to provide oxidation-resistance to the at least one microchannel.

15. The article of claim 14, wherein the microchannel terminates at on the opening on a surface of the substrate.

16. The article of claim 14, in the form of a gas turbine engine component.

17. The article of claim 14, wherein a width of the base is 3-4 times the width of the opening.

18. The article of claim 14, wherein the metallic coating comprises a metal aluminide composition or an MCrAlX composition, where M can be iron, nickel, cobalt, or combinations thereof; and X can be yttrium, tantalum, silicon, hafnium, titanium, zirconium, boron, carbon, or combinations thereof.

19. The article of claim 14, wherein the sidewalls are generally perpendicular or angled, relative to the base.

20. A method to modify the shape of a re-entrant shaped channel in a metallic substrate, the channel having a base, an opening in the substrate opposite the base, and sidewalls extending from the base to the opening, the method comprising:
   applying at least one layer of an oxidation resistant coating uniformly over the base and the sidewalls of the channel to provide oxidation-resistance to the channel; and
   applying at least one metallic coating on the at least one layer of the oxidation resistant coating at the base of the channel, so as to alter the heat transfer characteristics of the channel during passage of a coolant fluid there through.

* * * * *